P. A. G. STEERUP.
CONTAINER AND PROCESS OF PASTEURIZING THE SAME.
APPLICATION FILED JULY 26, 1916.
1,221,386.                                      Patented Apr. 3, 1917.
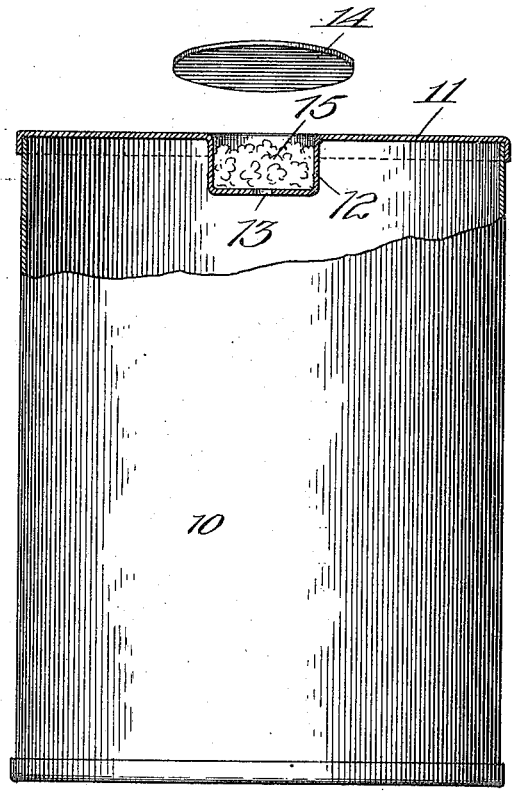
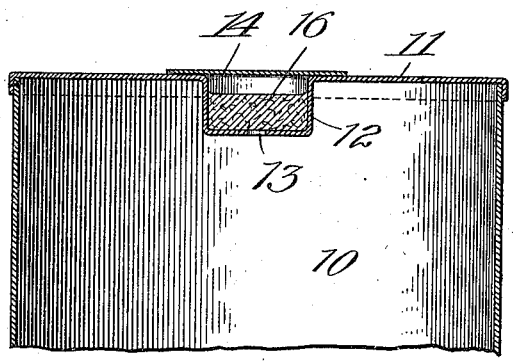

UNITED STATES PATENT OFFICE.

PETRARCH A. GODFREY STEERUP, OF CHICAGO, ILLINOIS, ASSIGNOR TO THE W. K. JAHN CO., OF CHICAGO, ILLINOIS, A CORPORATION OF ILLINOIS.

CONTAINER AND PROCESS OF PASTEURIZING THE SAME.

1,221,386.  Specification of Letters Patent.  Patented Apr. 3, 1917.

Application filed July 26, 1916. Serial No. 111,473.

*To all whom it may concern:*

Be it known that I, PETRARCH A. GODFREY STEERUP, a subject of the King of Denmark, residing at Chicago, in the county of Cook and State of Illinois, have invented a new and useful Improvement in Containers and Processes of Pasteurizing the Same, of which the following is a specification.

My invention relates to certain new and useful improvements in sealed containers, and more particularly, to containers used for packaging food products, either liquid or solid, which are subject to decay, decomposition, fermentation or other changes which lessen their value or render them unfit for use. In general, such changes are effected by the action of micro-organisms of various kinds, such as yeast cells, lactic acid bacteria, and the like. It is the specific object of my invention to provide a form of container in which the product to be preserved may be heated for the purpose of killing such micro-organisms, and which may be sealed after the said heat treatment to prevent subsequent contamination or infection. The invention will be better understood by reference to the accompanying drawings, in which—

Figure 1 is a side elevation of an ordinary sheet metal container, the cover-portion being shown in section and the sealing-cap in perspective above the aperture which it is to close; and Fig. 2 is a section through the upper end of the container, showing the positions of the parts after the container is sealed.

Referring more particularly to the drawings, the numeral 10 designates a cylindrical sheet-metal container which, it will be assumed, is filled with a food product, such, for instance, as syrup. After the can has been filled, the disk-like cover 11 is fitted upon the top and soldered or otherwise sealed about the edges. The cover 11 preferably has formed therein a cup-shaped depression 12, in the bottom of which there is a vent-aperture 13. There is also provided with each cover a separate sealing-cap 14 which may be in the form of a disk, as shown in Fig. 1. The numeral 15 in Fig. 1 designates a loose or pervious body of filtering material, such as cotton, glass-wool, or the like, the purpose of which will hereafter appear, and the numeral 16, in Fig. 2, designates a sealing-compound, such as paraffin-wax or solder with which the cup 12 is filled previous to applying the cap 14.

Assuming that the container 10 has been filled with the product to be preserved and that the cover 11 has been applied, a cup-like depression 12 in the cover is filled with some material, such as cotton or glass-wool which will permit the inward and outward flow of gases but will act as a trap or filter to prevent the passage of any micro-organism. After the filtering medium has been placed in the cup, the container is ready for the heat treatment, which may be carried out according to any of the usual methods by pasteurization or sterilization. In such heating of the container and its contents, any air within the container will be expanded and vented outwardly through the vent 13 and filter-mass 15, and in general, also, the product treated will contain water or other volatilizable substance which would create a pressure tending to destroy the container were it not permitted to vent itself during heating. By the heat treatment, which will be properly regulated according to the nature of the product to be pasteurized, the container will be either withdrawn from the pasteurizing oven or other receptacle, or will be permitted to cool within the latter. During such cooling of the container there will, in general, be a drop in pressure therein which will be relieved by the admission of gas or air through the vent-aperture 13. It is during this operation, *i. e.*, during the cooling of the container, that the filter-mass 15 performs its function of preventing the entrance of micro-organisms into the sterile interior of the container. Any such organisms which are contained in the atmosphere surrounding the container are trapped by the filter-mass and held in the latter.

The container is now ready for sealing. This is effected by pouring upon the filter-mass 15 in the cup 12 a fusible sealing compound such, for instance, as a paraffin-wax or solder.

This compound will close the vent-aperture 13 and will permeate the filter-mass, either killing instantaneously by its heat, or embedding harmlessly within itself as it cools any micro-organisms which may have been trapped in the filter. In order to protect the sealing-compound from rupture in handling, I prefer to supply the cap 14, which may be soldered in place, as indicated in Fig. 2 of the drawing.

The choice of materials to be used for the filter-mass and for the sealing compound will, of course, be dependent upon the particular nature of the heat treatment of the product, and the conditions of use of the same. For instance, if low pasteurizing temperatures are employed, ordinary absorbent cotton will be found satisfactory. If temperatures which would carbonize the cotton must be employed, then it is necessary to use a filter-mass capable of resisting such temperatures. So, also, paraffin-wax forms a satisfactory sealing compound where the container will not in use be subjected to any temperatures which would melt the wax. For higher temperatures, a compound of higher melting-point should obviously be employed. The process of pasteurizing or sterilizing package-goods, as above described, is particularly advantageous where relatively light sheet-metal containers which would be distorted by the internal pressure developed when pasteurizing without the use of a vent-opening are used, or when the vent-opening is sealed while the container is still hot, thus permitting the formation of a vacuum upon the cooling of the container. My process is further of advantage in that it may be carried out upon a small scale economically and without use of any expensive equipment.

While I have shown and described in considerable detail one specific form of container and the steps required for pasteurizing and sealing the same, it is to be understood that this showing and description is illustrative only and for the purpose of making my invention more clear, and that I do not regard the invention as limited to the above-mentioned details or to any of them, except in so far as I have included such limitations within the terms of the following claims, in which it is my intention to claim all novelty inherent in the invention as broadly as is permissible in view of the prior art.

What I claim as new and desire to secure by Letters Patent is—

1. The process of pasteurizing and sealing containers, which consists in applying to the vent-opening of the container before the latter is cool, a filter for micro-organisms, permitting the container to cool with such filter in place, and completely embedding that portion of the filter which may come into contact with the contents of the container in a sealing compound.

2. The process of pasteurizing and sealing, which consists in inclosing package goods in a container having a vent-aperture, fitting over the vent-aperture a porous substance adapted to act as a filter for micro-organisms, heating the container to pasteurize or sterilize the same, cooling the container, and finally embedding such filter in a sealing compound which seals the said vent-opening.

3. A sealed container comprising a body-portion having a vent-aperture through its wall, a filter-mass lying over the vent-aperture, and a sealing compound sealing the said vent-aperture and embedding the said filter-mass therein.

4. A sealed container comprising a body-portion having a cup-shaped depression in one wall thereof, there being a vent-aperture in the bottom of the cup, a filter-mass lying within the said cup, a sealing compound embedding the said filter-mass and closing the said vent-opening, and a cover-plate closing the open end of the said cup.

PETRARCH A. GODFREY STEERUP.